F. R. DALEY.
DOMESTIC STILL.
APPLICATION FILED JAN. 30, 1908.
915,273.
Patented Mar. 16, 1909.
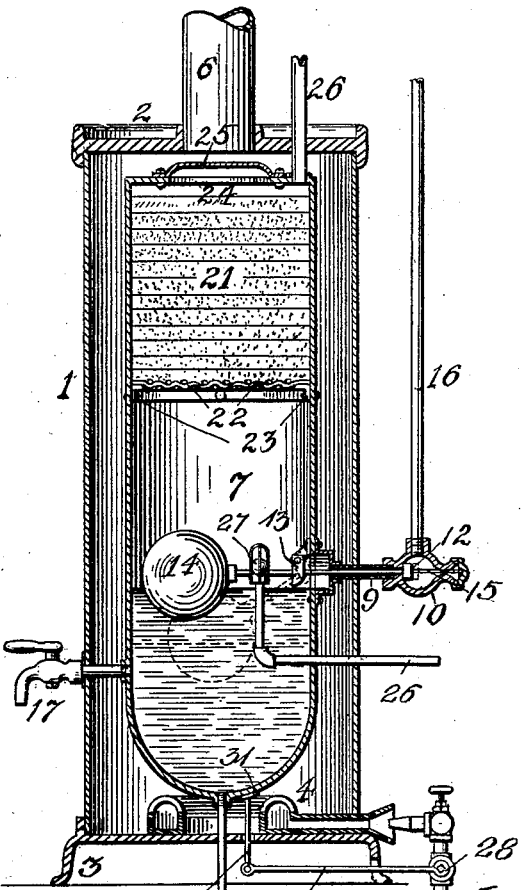
Witnesses
Geo. L. Thom
C. H. Griesbauer
Inventor
Frank Richard Daley
by A. B. Willson & Co.
Attorneys

UNITED STATES PATENT OFFICE.

FRANK RICHARD DALEY, OF PARKERSBURG, WEST VIRGINIA.

DOMESTIC STILL.

No. 915,273.  Specification of Letters Patent.  Patented March 16, 1909.

Application filed January 30, 1908. Serial No. 413,472.

*To all whom it may concern:*

Be it known that I, FRANK RICHARD DALEY, a citizen of the United States, residing at Parkersburg, in the county of Wood and State of West Virginia, have invented certain new and useful Improvements in Domestic Stills; and I do declare the following to be a full, clear, and exact description of the invention, such as will enable others skilled in the art to which it appertains to make and use the same.

This invention relates to improvements in domestic water stills.

The object of the invention is to provide a still of this character having arranged therein a filtering mechanism and provided with an automatically operating feed valve.

With this object in view, the invention consists of certain novel features of construction, combination and arrangement of parts as will be more fully described and particularly pointed out in the appended claims.

Figure 1 is a vertical sectional view of a still constructed in accordance with the invention; Fig. 2 is an enlarged detail sectional view of the supply valve, and the means for automatically operating the same; and Fig. 3 is a detail sectional view of the lower end of the boiler showing the manner in which the gas supply valve is automatically turned off should the boiler become dry.

In the embodiment of my invention, I provide an outer casing 1, which is in the form of a heating chamber, and is provided on its upper end with a removable cover plate 2. On the lower end of the casing 1 are arranged supporting feet, 3. On the bottom of the casing 1 is arranged a burner 4, which is connected with a valved gas supply pipe 5. In the cap or cover plate 2 at the upper end of the casing is arranged a vent pipe 6, which provides for the circulation or the passage of heated air through the casing.

Arranged in the casing 1 above the burner 4 is a water heating tank or boiler, 7, the lower end of which is preferably rounded, as shown. To one side of the tank or boiler 7 is connected a water supply pipe 9, the outer end of which is connected to a valve casing 10 in which is arranged an automatically operating cut-off valve 12, the stem of which extends through the pipe 9 and into the tank or boiler 7, where it is loosely engaged by a pivotally mounted operating block 13, to which is fixedly connected the stem of a hollow float 14, which is adapted to be raised and lowered by the rise and fall of the water in the tank, thereby actuating the block 13 and causing the same to open the valve 12 when the water in the boiler or tank 7 has boiled down or has been otherwise removed from the tank, thus preventing the tank from boiling dry or being emptied. The valve 12 is provided with a guide stem 15, the outer end of which is slidably mounted in the guide passage formed in one side of the valve casing 10. To the casing 10 is connected a water supply pipe 16. After the valve 12 has been opened by the float and sufficient water has entered the tank 7 to again raise the float and thereby relieve the pressure of the same from the stem of the valve, the pressure of the water from the supply pipe 16 entering the valve casing 10 will close the valve and thus automatically cut off the supply of water to the tank until the water therein has been again lowered, at which time the float 14 will act upon the valve 12 and open the same, as hereinbefore described.

Connected to the tank near its lower end is a draw-off cock, 17, by means of which hot water may be drawn from the tank or boiler 7 when desired. To the lower end of the tank is connected a drain pipe 18, the lower end of which connects with a sediment receptacle, 19, having arranged in its lower end a drain cock, 20.

In the upper portion of the tank or boiler 7 is arranged a suitable filtering device, 21, said device resting on a screen, 22, which is supported upon brackets 23 secured to the inner side of the tank, as shown. The upper end of the tank above the filtering material is provided with an opening, 24, which is normally closed by a dome-shaped cap, 25. To the upper end of the tank is also connected a steam conducting pipe, 26, by means of which the steam after passing through the filtering mechanism is conducted to a suitable condensing coil, not shown.

Arranged in the tank, 7, is an over-flow pipe, 27, the upper end of which is about on the line with the supply pipe, 9. The outer end of the over-flow pipe may connect with a sewer. On the upper end of the pipe, 26, is formed a valve seat on which is adapted to be normally seated a floatable ball valve, 27, which, when the water in the tank rises above the end of the over-flow pipe, will be floated thereby and raised from its seat and the water thus permitted to escape through the over-flow pipe. The ball valve, 27, is held in position to re-seat itself when the water in the tank lowers, by a suitable cage arranged on the upper end of the pipe, 26, as shown.

In the gas supply pipe 5, below the cut-off valve therein, is arranged an automatically-operated safety valve, 28, to which is connected an operating arm, 29, the outer end of which is pivotally connected to a releasing rod, 30. The upper end of the rod, 30, is secured to a plate, 31, which is soldered to the bottom of the tank whereby should the water in the water supply pipe become inoperative, or the supply of water be cut off from the tank from any cause, and the tank boil dry, the empty tank will immediately become sufficiently heated to melt the solder which holds the plate, 31, to the tank and thus let the rod, 30, and operating arm, 29, drop. The weight of these parts will be sufficient to turn off the safety valve, 28, and thus put out the light under the tank.

Having described my invention, I claim:

1. A domestic water still comprising a tank or boiler, a burner arranged below said tank, a casing entirely surrounding said tank and burner, a vent pipe in the upper end of said casing, a filtering mechanism in the upper end of said tank, or boiler, a water-supply pipe connected to said tank, a valve casing arranged in said pipe, a cut-off valve slidably mounted in said casing, a pivotally mounted valve-operating block adapted to loosely engage the inwardly projecting stem of said valve, and a float fixedly connected to said block whereby the same is engaged with and disengaged from the stem of said valve thereby opening the same upon the fall of the water in the tank, substantially as described.

2. A domestic water still comprising a heat conducting casing, a burner arranged in the lower end of said casing, a tank or boiler arranged above said burner, a drain pipe connected to the lower end of said tank, a sediment receptacle connected to said pipe, a drain cock connected to said receptacle, a water-supply pipe connected to said tank, a valve casing arranged in said pipe, a valve slidably mounted in said casing, a stem connected to said valve and adapted to project through the pipe and into said tank, a pivotally-mounted, float-operated, valve-actuating block adapted to be engaged with and disengaged from the end of said stem by the fall and rise of the water in the tank to automatically open said valve and permit the same to be closed by the pressure of the cock connected to said tank, substantially as described.

In testimony whereof I have hereunto set my hand in presence of two subscribing witnesses.

FRANK RICHARD DALEY.

Witnesses:
W. S. ALLEN,
D. W. DALEY.